(12) United States Patent
Nagalla

(10) Patent No.: US 10,354,126 B1
(45) Date of Patent: Jul. 16, 2019

(54) ACCESS CONTROL THROUGH MULTI-FACTOR IMAGE AUTHENTICATION

(71) Applicant: Massachusetts Mutual Life Insurance Company, Springfield, MA (US)

(72) Inventor: Durga Nagalla, Woburn, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 35 days.

(21) Appl. No.: 15/494,152

(22) Filed: Apr. 21, 2017

Related U.S. Application Data

(60) Provisional application No. 62/327,483, filed on Apr. 26, 2016.

(51) Int. Cl.
| | |
|---|---|
| *G06K 9/00* | (2006.01) |
| *G06F 21/32* | (2013.01) |
| *G06Q 20/40* | (2012.01) |
| *G07F 19/00* | (2006.01) |

(52) U.S. Cl.
CPC ......... *G06K 9/00288* (2013.01); *G06F 21/32* (2013.01); *G06K 9/00335* (2013.01); *G06Q 20/40145* (2013.01); *G07F 19/206* (2013.01)

(58) Field of Classification Search
None
See application file for complete search history.

(56) References Cited

U.S. PATENT DOCUMENTS

| | | | |
|---|---|---|---|
| 5,481,622 | A | 1/1996 | Gerhardt et al. |
| 6,637,883 | B1 | 10/2003 | Tengshe et al. |
| 8,970,348 | B1 * | 3/2015 | Evans ............... G06K 9/00 340/5.52 |
| 9,129,154 | B2 | 9/2015 | Kim et al. |
| 9,159,203 | B2 | 10/2015 | Priesterjahn et al. |
| 9,202,105 | B1 | 12/2015 | Wang et al. |

(Continued)

OTHER PUBLICATIONS

M. Mahmoud et al., "Automatic analysis of naturalistic hand-over-face gestures", ACM Transactions on Interactive Intelligent Systems, vol. 6 Issue 2, Aug. 2016, 17 pages.

(Continued)

*Primary Examiner* — Kevin Ky
(74) *Attorney, Agent, or Firm* — Eric L. Sophir; Dentons US LLP

(57) ABSTRACT

A method and system for authenticating users accessing financial accounts from user terminals via multi-factor image authentication. The system includes an authentication server and a user terminal. The method captures a first facial image of a user and compares this image with stored facial recognition credentials. The method prompts the user via a facial gesture cue to make a facial gesture, captures a second facial image of the user, and compares the second image with stored facial gesture credentials. The user is authorized to perform a transaction in the event the first facial image matches a facial recognition credential for an authorized account, and the second facial image matches a facial gesture credential associated with the authorized account. Facial gesture credentials may be based upon static gestures or dynamic gestures, and may be overt or secret. An additional authentication factor may employ a secondary biometric sensor.

17 Claims, 9 Drawing Sheets

(56) References Cited

U.S. PATENT DOCUMENTS

| | | | |
|---|---|---|---|
| 2008/0005578 A1* | 1/2008 | Shafir | G06K 9/00067 |
| | | | 713/186 |
| 2009/0153366 A1 | 6/2009 | Im et al. | |
| 2009/0201372 A1 | 8/2009 | O'Doherty et al. | |
| 2009/0320123 A1 | 12/2009 | Yu et al. | |
| 2010/0141380 A1* | 6/2010 | Pishva | G06K 9/0012 |
| | | | 340/5.2 |
| 2010/0174914 A1* | 7/2010 | Shafir | G06K 9/00067 |
| | | | 713/186 |
| 2011/0183732 A1* | 7/2011 | Block | G06Q 30/02 |
| | | | 463/1 |
| 2012/0066079 A1* | 3/2012 | Falzone | G06Q 20/20 |
| | | | 705/16 |
| 2013/0121584 A1* | 5/2013 | Bourdev | G06K 9/00281 |
| | | | 382/190 |
| 2013/0167212 A1 | 6/2013 | Azar et al. | |
| 2013/0173926 A1* | 7/2013 | Morese | G06F 21/32 |
| | | | 713/186 |
| 2013/0223696 A1 | 8/2013 | Azar et al. | |
| 2013/0227651 A1 | 8/2013 | Schultz et al. | |
| 2013/0246264 A1 | 9/2013 | Lucas et al. | |
| 2013/0347087 A1 | 12/2013 | Smith | |
| 2014/0059673 A1* | 2/2014 | Azar | G06F 21/32 |
| | | | 726/19 |
| 2014/0337221 A1 | 11/2014 | Hoyos | |
| 2015/0058950 A1* | 2/2015 | Miu | H04L 63/105 |
| | | | 726/7 |
| 2015/0088547 A1* | 3/2015 | Balram | G06F 19/3418 |
| | | | 705/3 |
| 2015/0169862 A1 | 6/2015 | Smith | |
| 2015/0186708 A1 | 7/2015 | Katz | |
| 2015/0262150 A1 | 9/2015 | Morgan | |
| 2015/0294283 A1 | 10/2015 | Siemasko | |
| 2015/0347734 A1* | 12/2015 | Beigi | G06F 21/32 |
| | | | 713/155 |
| 2015/0348048 A1* | 12/2015 | Kurian | G06F 9/546 |
| | | | 705/304 |
| 2016/0019539 A1* | 1/2016 | Hoyos | G06Q 20/3821 |
| | | | 705/75 |
| 2016/0071111 A1 | 3/2016 | Wang et al. | |
| 2017/0063852 A1* | 3/2017 | Azar | G06F 21/32 |
| 2017/0243225 A1* | 8/2017 | Kohli | G06Q 20/40145 |
| 2017/0293746 A1* | 10/2017 | Mitsunaga | G06F 21/34 |

OTHER PUBLICATIONS

Y. Sun et al., "Facial Expression Recognition Based on 3D Dynamic Range Model Sequences", conference paper at European Conference on Computer Vision, Springer, Berlin, Heidelberg copyright 2008, 14 pages.

H. Gunes et al., "A Bimodal Face and Body Gesture Database for Automatic Analysis of Human Nonverbal Affective Behavior", conference paper at 18th International Conference on Pattern Recognition (ICPR'06), Aug. 2006, 5 pages.

S. Mitra, "Gesture Recognition: A Survey", IEEE Transactions on Systems, Man, and Cybernetics, Part C (Applications and Reviews), vol. 37, Issue: 3, May 2007, 14 pages.

M. Mahmoud et al., "Interpreting hand-over-face gestures", Affective Computing and Intelligent Interaction. Lecture in Computer Science, vol. 6975., Springer, Berlin, Heidelberg, 2011, 8 pages.

M. Turk et al., "Eigenfaces for Recognition", Journal of Cognitive Neuroscience, vol. 3, No. 1, Winter 1991, 16 pages.

Z. Zhang, "Microsoft Kinect Sensor and Its Effect", IEEE MultiMedia, vol. 19, Issue 2, published Apr. 27, 2012, 7 pages.

http://www.recode.net/2016/3/14/11586942/amazon-wants-the-patent-for-pay-by-selfie, J. Del Rey, "Amazon Wants the Patent for Pay-By-Selfie", Mar. 14, 2016, 2 pages.

D. Heylen, "Head Gestures, Gaze and the Principles of Conversational Structure", International Journal of Humanoid Robotics, vol. 3, No. 3, published Aug. 19, 2006, 27 pages.

\* cited by examiner

ACCESS CONTROL THROUGH MULTI-FACTOR IMAGE AUTHENTICATION

CROSS-REFERENCE TO RELATED APPLICATION

The present application claims benefit of U.S. Provisional Application 62/327,483, filed Apr. 26, 2016, entitled ACCESS CONTROL THROUGH MULTI-FACTOR IMAGE AUTHENTICATION, the entire contents of which are hereby incorporated by reference.

TECHNICAL FIELD OF DISCLOSURE

The present disclosure relates generally to systems and methods for authentication of individuals engaging in transactions, and more particularly to authentication through multi-factor facial image recognition.

BACKGROUND

Various authentication methods are employed to authenticate users accessing financial accounts from user terminals. For example, when accessing an account from an automated teller machine (ATM), users are typically required to provide a physical card and a personal identification number (PIN). On most modern ATMs, the customer is identified after inserting a plastic ATM card with a magnetic stripe or a plastic smart card with a chip, that contains a unique card number and some security information such as an expiration date and CVV code. Authentication is typically provided by the customer entering a PIN, but other authentication techniques may be implemented. Using an ATM, customers can access their bank accounts in order to make deposits of cash or checks, make cash withdrawals, obtain credit card cash advances, and check their account balances as well as other functions.

One issue with ATMs and other such secret password authentication based systems is that they are vulnerable to fraud. For example, while in previous decades, ATMs retained an inserted bank card through the duration of a transaction, currently existing ATMs merely require customers to swipe or dip the card to be read. At the end of a transaction, the customer is typically prompted for further action during an authentication session. Since the customer has already reclaimed his ATM card and has completed the transaction, the customer might vacate the ATM prior to termination of authentication, thus leaving the authenticated session open for potential fraudulent use.

Additionally, malicious users may obtain bank account information by attaching scanning devices to an ATM to read a transaction card and record the embedded account information, and also obtain the user's PIN number by watching or recording video of the user entering the PIN on the ATM keypad. Once the malicious user has the account information and PIN, he has access to the user's account. Other systems in which a user enters a password, PIN, log-in or other private information are similarly susceptible to fraud. For example, a malicious user can obtain a user's secure website log-in and password by watching the user input the private information.

ATMs are frequently equipped with cameras for security reasons that also may be capable of capturing video and snapshots of the customer facing the camera. Recently, various financial institutions have started to use still imaging or video imaging in their ATMs to authenticate customer access. Instead of, or as an alternative to, using a bank card or personal identification number, such ATMs capture an image of the customer's face and compare it to the account holder's photo in the financial institution's database to confirm the customer's identity.

Although customer authentication by facial recognition offers various advantages, it too can be vulnerable to fraud when employed as a stand-alone authentication technique. For example, one way to trick or "spoof" a facial recognition system is to present a two dimensional representation (e.g., picture, photograph, etc.) of a person in front of the camera, where the two-dimensional image shows a front view of that person. The two dimensional image can cause the system to identify an authorized user based on the features in the picture or photograph. Therefore, a malicious user may be able to gain access to an ATM account or other secured system simply by procuring a picture or other artificial representation of an authorized user.

Accordingly, there is a need for solutions for identifying and authenticating users of ATMs and other electronic devices such as described above. Such solutions desirably should be extremely difficult to circumvent, and should provide an improved user experience. Both users and financial institutions would benefit from a decrease in fraudulent transactions.

SUMMARY

Disclosed herein are systems and methods for authenticating users accessing financial accounts from user terminals such as automatic teller machines (ATMs). According to an embodiment, a user authentication operates within a system hardware and software architecture and authenticates users to process a requested transaction. According to an embodiment, a system and method of authenticating user access to financial accounts uses multi-factor facial image authentication to decrease the potential for fraudulent transactions. The system and method captures a first facial image of a user and compares this image with stored facial recognition credentials. The method prompts the user via a facial gesture cue to make a facial gesture, captures a second facial image of the user, and compares the second image with stored facial gesture credentials. The user is authorized to perform a transaction in the event the first facial image matches a facial recognition credential for an authorized account, and the second facial image matches a facial gesture credential associated with the authorized account. An additional authentication factor may employ a secondary biometric sensor.

In an embodiment, a system for authenticating users accessing financial accounts includes an authentication server and a user terminal, such as a user terminal in accordance with an ATM protocol. The user terminal includes one or more front-facing imaging sensor, such as a still camera, a video camera, or a combination of such cameras. The system detects the presence of a user to commence the authentication process. An authentication server stores user credential records for authorized users of the financial institution. These user credential records are compared with facial images and optionally with other biometric data of a user seeking to perform a transaction.

In an embodiment, facial gesture credentials may be representative of a static facial gesture, a dynamic facial gesture, or both. In an embodiment, facial gesture credentials may be representative of an overt facial gesture, or may be representative of a secret facial gesture known only to an authorized user.

In an embodiment, a processor-based method, comprises detecting, by a processor in operative communication with a user terminal, presence of a user requesting a cash withdrawal transaction at the user terminal; capturing, by an imaging sensor of the user terminal in operative communication with the processor in response to the detecting the presence of the user, first imaging data including a first facial image of the user; transmitting, by the user terminal, the first imaging data to the processor; determining, by the processor, whether the first imaging data matches a facial recognition credential record for an authorized user included in a plurality of facial recognition credential records stored by the processor; generating, by the processor in the event the first imaging data matches the facial recognition credential record for the authorized user, a facial gesture cue for display by an output device in operative communication with the processor, wherein the facial gesture cue is selected from a plurality of facial gesture cues stored by the processor for the authorized user; capturing, by the imaging sensor of the user terminal upon the display of the facial gesture cue, second imaging data including a second facial image of the user; transmitting, by the user terminal, the second imaging data to the processor; determining, by the processor, whether the second imaging data matches a facial gesture credential record for the authorized user included in a plurality of facial recognition credential records stored by the processor; and in the event the first imaging data matches the facial recognition credential record for the authorized user and the second imaging data matches the facial gesture credential record for the authorized user, authorizing, by the processor, the cash withdrawal transaction for processing; and activating, by the user terminal, a dispensing of cash from the user terminal based on the cash withdrawal transaction authorized by the processor.

In an embodiment, a system comprises an imaging sensor of a user terminal for capturing first imaging data including a first facial image of a user requesting a cash withdrawal transaction at the user terminal, and for capturing second imaging data including a second facial image of the user; an output device of the user terminal; an authentication database hosted by one or more servers comprising non-transitory machine-readable memory, the authentication database configured to store a plurality of facial gesture cues, a plurality of facial recognition credential records, and a plurality of facial gesture credential records; one or more server computers comprising one or more processing units executing an authentication module, the one or more server computers in communication with the non-transitory memory and the authentication module configured to execute a set of instructions instructing the one or more servers to: receive from the imaging sensor the first imaging data including the first facial image of the user after detecting presence of the user requesting the cash withdrawal transaction at the user terminal; determine whether the first imaging data matches a facial recognition credential record for an authorized user included in the plurality of facial recognition credential records stored by the authentication database; generate a facial gesture cue for display by the output device in the event the first imaging data matches the recognition credential record for the authorized user, wherein the facial gesture cue is selected from two or more facial gesture cues associated with the authorized user included in the plurality of facial gesture cues stored by the authentication database; receive from the imaging sensor the second imaging data including the second facial image of the user upon the display of the facial gesture cue; determine whether the second imaging data matches a facial gesture credential record for the authorized user included in the plurality of facial gesture credential records stored by the authentication database; and in the event the first imaging data matches the facial recognition credential record for the authorized user, and the second imaging data matches the facial gesture credential record for the authorized user, authorize the cash withdrawal transaction for processing, and activate a dispensing of cash based on the authorized cash withdrawal transaction at the user terminal.

In an embodiment, a processor-based method, comprises detecting, by a processor in operative communication with a user terminal, presence of a user requesting a cash withdrawal transaction at the user terminal; generating, by the processor in operative communication with an output device of the user terminal in response to the detecting the presence of the user, a facial gesture cue for display by the output device, wherein the facial gesture cue is selected from a plurality of facial gesture cues stored by the processor; capturing, by an imaging sensor of the user terminal in operative communication with the processor upon the display of the facial gesture cue by the output device, imaging data including a facial image of the user; transmitting, by the user terminal, the imaging data to the processor; determining, by the processor, whether the imaging data matches a modified facial recognition template stored by the processor for an authorized user; generating, by the processor in operative communication with an output device of the user terminal in the event the imaging data matches a modified facial recognition template stored by the processor for an authorized user, a biometric cue for display by the output device, wherein the biometric cue is selected from one or more biometric cue stored by the processor for the authorized user; capturing, by a biometric sensor of the user terminal, biometric authentication data upon the display of the biometric cue; transmitting, by the user terminal, the biometric authentication data to the processor; determining, by the processor, whether the biometric authentication data matches a biometric credential record stored by the processor for the authorized user; and in the event the imaging data matches the modified facial recognition template stored by the processor for the authorized user and the biometric authentication data matches the biometric credential record stored by the processor for the authorized user, authorizing, by the processor, the cash withdrawal transaction for processing; and activating, by the user terminal, a dispensing of cash from the user terminal based on the cash withdrawal transaction authorized by the processor.

A processor-based method comprises detecting, by a processor in operative communication with a user terminal, presence of a user requesting a cash withdrawal transaction at the user terminal; generating, by the processor in operative communication with an output device of the user terminal in response to the detecting the presence of the user, a facial gesture cue for display by the output device, wherein the facial gesture cue prompts the user to execute a given facial gesture corresponding to modified facial recognition templates stored by the processor for a plurality of authorized users, wherein the modified facial recognition templates comprise facial images of the plurality of authorized users performing the given facial gesture; capturing, by a imaging sensor of the user terminal in operative communication with the processor upon the display of the facial gesture cue, imaging data including a facial image of the user; determining, by the processor, whether the imaging data matches a modified facial recognition template for an authorized user included in the modified facial recognition templates stored by the processor for the plurality of authorized users; in the event the imaging data matches the modified facial recognition template for the authorized user, generating, by the processor, a biometric cue for display by the output device, wherein the biometric cue is selected from a plurality of biometric cue stored by the processor; capturing, by a biometric sensor of the user terminal, biometric authentication data upon the display of the biometric cue; determining, by the processor, whether the biometric authentication data matches a biometric credential record stored by the processor for the authorized user; and in the event the imaging data matches the modified facial recognition template for the authorized user and the biometric authentication data matches the biometric credential record stored by the processor for the authorized user, authorizing, by the processor, the cash withdrawal transaction for processing; and activating, by the user terminal, a cash dispensing for the cash withdrawal transaction authorized by the processor.

In an embodiment, a system, comprises an imaging sensor of a user terminal for capturing imaging data including a facial image of a user requesting a cash withdrawal transaction at the user terminal; a biometric sensor of the user terminal for capturing biometric data including biometric authentication data of the user requesting the cash withdrawal transaction; an output device of the user terminal; an authentication database hosted by one or more server computers comprising non-transitory machine-readable memory, the authentication database configured to store a plurality of modified facial recognition templates for a plurality of authorized users and to store a plurality of biometric credential records, wherein the modified facial recognition templates comprise facial images of the plurality of authorized users performing a given facial gesture; the one or more server computers comprising one or more processing units executing an authentication module, the one or more server computers in communication with the non-transitory memory and the authentication module configured to execute a set of instructions instructing the one or more server computers to: generate a facial gesture cue for display by the output device after detecting presence of the user requesting the cash withdrawal transaction at the user terminal, wherein the facial gesture cue prompts the user to execute the given facial gesture corresponding to the modified facial recognition templates stored by the authentication database for the plurality of authorized users; receive from the imaging sensor the imaging data including the facial image of the user captured by the imaging sensor upon the display of the facial gesture cue; determine whether the imaging data matches a modified facial recognition template for an authorized user included in the plurality of modified facial recognition templates stored by the authentication database for the plurality of authorized users; generate a biometric cue for display by the output device in the event the imaging data matches a modified facial recognition template for an authorized user; receive from the biometric sensor the biometric authentication data of the user, captured by the biometric sensor upon the display of the biometric cue; determine whether the biometric authentication data matches a biometric credential record stored by the processor for the authorized user; and in the event the imaging data matches the modified facial recognition template for the authorized user, and the biometric authentication data matches a biometric credential record stored by the processor for the authorized user, authorize the cash withdrawal transaction for processing, and activate a cash dispensing from the user terminal based on the authorized cash withdrawal transaction.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
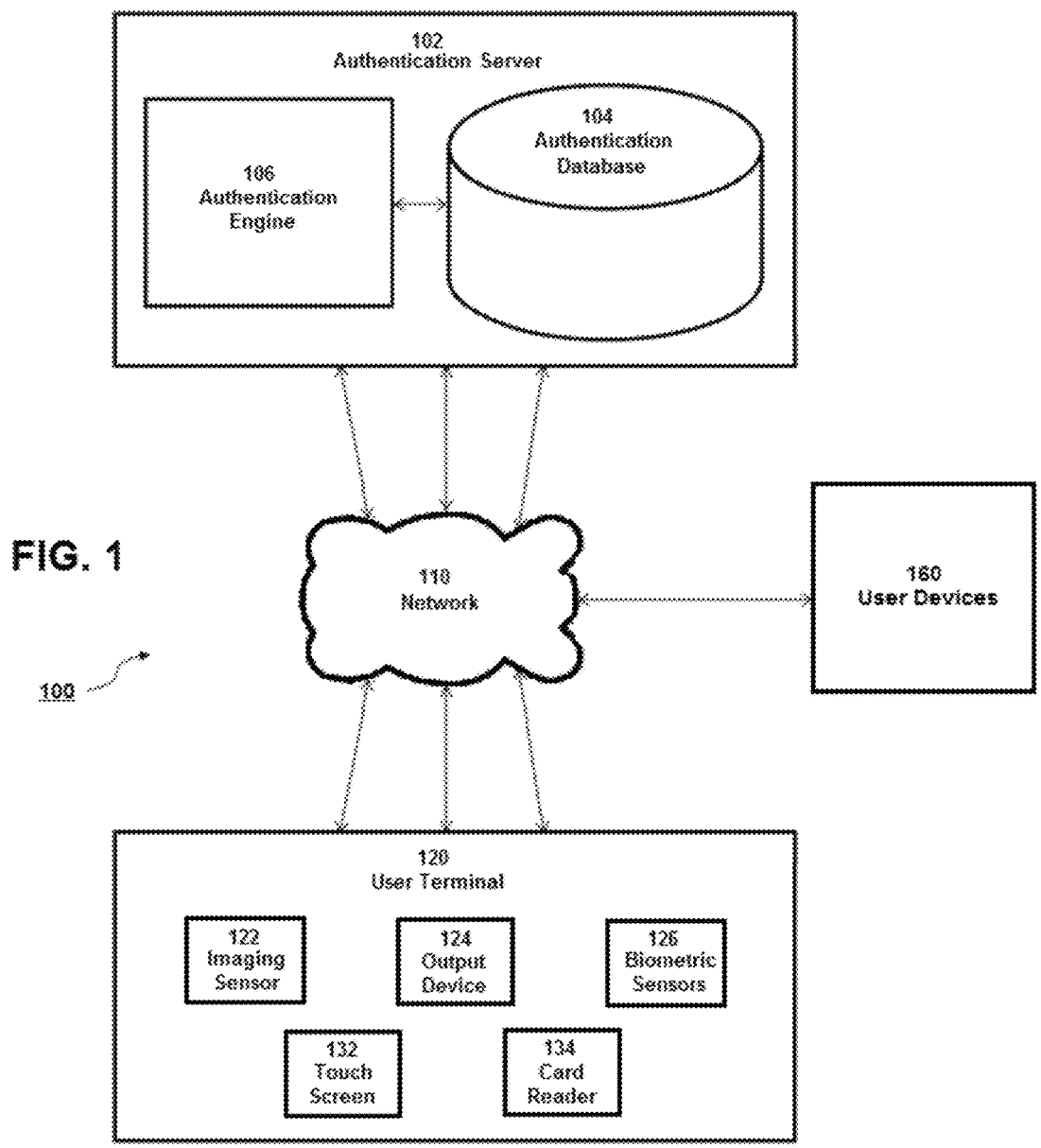
FIG. 1 is a block diagram illustrating a system for authenticating a user accessing a financial account from a user terminal, according to an exemplary embodiment.

The present disclosure is here described in detail with reference to embodiments illustrated in the drawings, which form a part hereof. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

System Components and Architecture

FIG. 1 is a block diagram illustrating a system 100 for authenticating a user accessing a financial account from a user terminal (also herein called user authentication system 100), according to an exemplary embodiment. Major components of the user authentication system 100 include an authentication server 102 and a user terminal 120. In addition, the system may include user devices 160 of authorized users of the system. In system 100, user terminal 120 and user devices 160 are in operative communication with the authentication server 102 over network 110. Each of the different components of user authentication system 100 may be implemented in any type of computer-based architecture including suitable processor-controlled devices that receive, process, and/or transmit digital data, configured as further described below and in FIG. 1. The user authentication system 100 may include any computing device (e.g., server, personal computer, desktop, laptop) or collection of computing devices (i.e., a distributed-computing environment), comprising processors, software modules, and non-transitory machine-readable storage media, capable of performing the various tasks and processes described herein.

In the embodiment of FIG. 1, major components of user terminal 120 include one or more imaging sensor 122, biometric sensors 126, output device 124, and user input devices such as touch screen 132 and card reader 134.

In an embodiment, the imaging sensor 122 is a camera capable of capturing both video and still images. ATMs are frequently equipped with cameras for security reasons that also may be capable of capturing video and snapshots of a user facing the camera. The imaging sensor may include a single camera, or multiple cameras providing additional image capture capabilities. In an embodiment, imaging sensor includes one or more front-facing camera for capturing a front view of a user.

The user terminal 120 also may include one or more biometric sensors 126, to provide one or more authentication factor in addition to facial imaging using the imaging sensor(s).

Output device 124 may include a visual output device such as a visual display. In some embodiments, output device 124 may include any medium capable of transmitting a visual output such as, for example, a cathode ray tube, light emitting diodes, a liquid crystal display, a plasma display, or the like. Output device 124 may also include an audio output device. In some embodiments, output device 124 may include any medium capable of transmitting an audio output such as speakers. As used herein, "to display" means to provide a visual and/or audio representation at the output device 124 of user terminal 120. In the present system and methods, output device 124 may display user cues, such as facial gesture cues and biometric cues, in the form of visual and/or audio information.

User input devices such as touch screen 132, card reader 134, and other input controls such as buttons of a physical keypad (not shown), may be configured to accept user inputs for authenticating user access, such as card access and entry of PINs, as known in traditional ATM protocols. In this event, the present system and method for authenticating user access via multi-factor image authentication, would provide methods of accessing user accounts in addition to these traditional methods. Alternatively, the present system and method for authenticating user access via multi-factor image authentication may take the place of such traditional user authentication mechanisms.

In an embodiment, the authentication server 102 is managed by a financial institution. Authentication database 104 maintains records of a plurality of financial accounts of authorized users, who may be customers of the financial institution. In an embodiment, the user terminal 120 may be configured to operate with an ATM protocol. In an embodiment, user terminal 120 may be one of a plurality of user terminals in operative communication with the authentication server 102, and may be located at a plurality of venues for the convenience of different users or customers of the financial institution. In an embodiment, user terminal 120 is configured to detect presence of a user requesting a transaction to be executed at the user terminal, and user terminal 120 in operative communication with authentication server 102 is configured to determine whether the user is an authorized user and in that event, to activate the requested transaction. An authorized transaction can include one or more banking transaction including withdrawing cash, depositing money, making a payment, effecting a money transfer, and providing account information for the authorized user's account.

In an embodiment, the user terminal 120 is an automated teller machine that includes one or more mechanical devices for carrying out types of banking transactions, such as a currency dispenser device and a deposit accepting device. A currency dispenser device, alternatively referred to herein as a cash dispenser, may be positioned in a delivery area of the ATM. The delivery area is a transaction area on the machine in which currency sheets are delivered to a user. In an embodiment, the delivery area may be a recessed pocket of the housing of the ATM (not shown). In another embodiment, the ATM includes a deposit envelope providing opening. Deposit envelopes may be provided from the deposit envelope providing opening to users who may place deposits in the machine. In an embodiment, the ATM includes an deposit envelope accepting device (not shown).

In some embodiments, the ATM protocol and data formats used between system devices is proprietary. That is, the financial institution or other operator of a financial transaction system designs its own protocol and data message format for communication with a server or other processor at a central site. In some embodiments, the protocol may be a variant within a standard, such as standards established by the American National Standards Institute (ANSI) or the International Organization for Standardization (ISO). In some embodiments, remote terminals such as user terminal 120 include software that supports the financial institution's protocol and message formats in order to be compatible with the financial institution's central site, e.g., authentication server 102.

In FIG. 1, authentication engine 102 within authentication server 102 receives data from authentication database 104, which is communicatively coupled to authentication engine 102. In the embodiment described here, authentication server 102 receives data from application programs resident on one or more user terminal 120, processes the received data, and stores the processed data in the authentication database 104. Additionally, authentication server 102 may receive data from application programs resident on one or more user devices 160, process the received data, and store the processed data in the authentication database 104.

Figure 7:
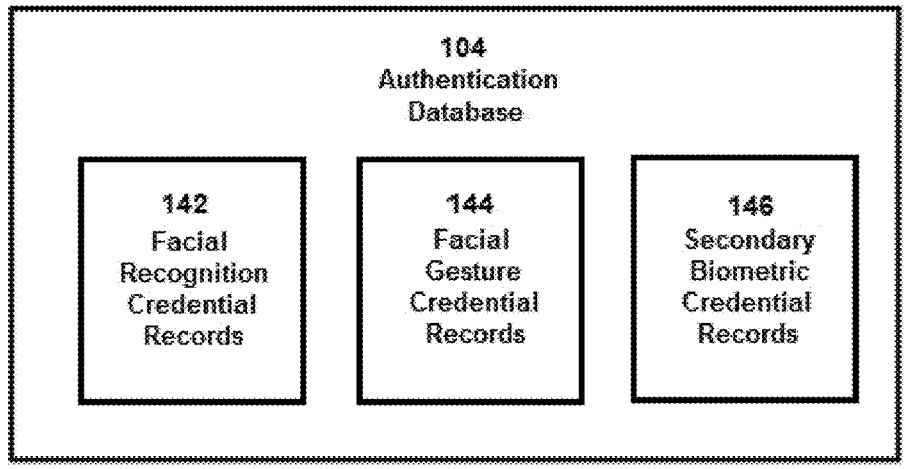
FIG. 7 is a block diagram illustrating component databases included in an authentication database, according to the embodiment of FIG. 1.

As shown in the block diagram of FIG. 7, authentication database 104 may include component data modules, in this embodiment including facial recognition credential records 142, facial gesture credential records 144, and secondary biometric credential records 146. As used herein, the term "user credential records" refers to user access credentials data stored by authentication database 104 for authorized users of the user authentication system 100, for example including facial recognition credential records, facial gesture credential records, and secondary biometric credential records. The user credential records can be stored in a single database, in nested databases, or otherwise interconnected databases. Authentication database 104 may be implemented as a database management system, such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data, such as, for example, a relational database, a multi-dimensional database, and the like.

Additionally, authentication database 104 may store a plurality of facial gesture cues and/or a plurality of biometric cues. Facial gesture cues and biometric cues communicated by authentication server 102 to user terminal 120 cause output device 124 to display visual and/or audio messages that prompt a user to execute a given facial gesture or to carry out a given biometric action. As used herein, facial gesture cues and biometric cues may indicate information generated by authentication server 102, or a visual and/or audio representation of that information displayed by output device 124. Facial gesture cues and biometric cues may include verbal information, graphical information, or both. For example, a facial gesture cue may include a verbal description of a given facial gesture, in combination with a graphical display providing spatial information about the given facial gesture.

Facial gesture cues and biometric cues may provide overt instructions to execute a given facial gesture or to carry out a given biometric action, or may provide instructions that depend upon private knowledge of an authorized user, also herein called private instructions. For example, a secret facial gesture cue may instruct a user to carry out a facial gesture selected from a secret list, such as "your second facial gesture" or "your facial gesture for this day of the week"

Facial gesture cues and biometric cues may be associated with given authorized users (user cues). For example, a given authorized user may configure a plurality of facial gesture cues and/or biometric cues during set-up of the user's account. Authentication database 104 may associate user cues with user credential records. For example, authentication database 104 may store a plurality of facial gesture credential records for a given user, each facial gesture credential record being associated in authentication database 104 with a given facial gesture cue. In an exemplary embodiment, each of a plurality of stored facial gesture credential records is representative of a given secret facial gesture, and the stored facial gesture cue associated with that facial gesture credential record prompts a user to execute the given secret facial gesture.

The authentication engine 106 requests, collects, analyzes, and presents information from and to one or more user terminal 120. In some embodiments, data processing modules of the authentication engine 106 are further configured to automatically retrieve information requested by one or more user terminal 120 and/or one or more software modules. In an embodiment, the authentication engine 106 also requests, collects, analyzes, and presents information from and to one or more user devices 160. In some embodiments, data processing modules of the authentication engine 106 are further configured to automatically retrieve information requested by one or more user devices 160. Data communicated between the various devices, servers, and other components of the system 100 can be encrypted, stored, decrypted, and distributed using one or more firewalls, antivirus and anti-phishing software, file encryption protocols, and other encryption software.

The authentication engine 106 can also generate graphical user interfaces on the user terminal 120, and optionally can generate graphical user interfaces on one or more user devices 160 to facilitate interaction with the user authentication system 100 via a network 110, and to perform associated data acquisition and processing functionalities. These interfaces can be implemented within an operating system, a discrete GUI software layer, an application program, or any combination thereof. One or more client-side and server-side technologies or combinations thereof can be implemented to ensure that the graphical user interfaces are dynamically generated based on the updates to the records in the authentication database 104. Content for web-based or app-based interfaces can be dynamically generated on user terminal 120 and on user devices 160, based on updates to the authentication database 104 and plurality of inputs from the user terminal 120 or user devices 160, as applicable.

In some embodiments, authentication engine 106 can be executed by a server, one or more server computers, authorized client computing devices, smartphones, desktop computers, laptop computers, tablet computers, PDAs and other types of processor-controlled devices that receive, process, and/or transmit digital data. The authentication engine 106 can be implemented using a single-processor system including one processor, or a multi-processor system including any number of suitable processors that may be employed to provide for parallel and/or sequential execution of one or more portions of the techniques described herein. Authentication engine 106 performs these operations as a result of central processing unit executing software instructions contained within a computer-readable medium, such as within memory. In one embodiment, the software instructions of the system are read into memory associated with the authentication engine 106 from another memory location, such as from a storage device, or from another computing device via communication interface. In various embodiments, the software instructions contained within memory instruct the authentication engine 106 to perform processes that are described in FIGS. 2, 3, 9, and 10 as described below. Alternatively, hardwired circuitry may be used in place of or in combination with software instructions to implement the processes described herein. Thus, implementations described herein are not limited to any specific combinations of hardware circuitry and software.

In certain embodiments, the authentication engine 106 can interact with user devices 160 through one or more application programmable interfaces ("APIs"), RSS feeds, or some other structured format. In these embodiments, the authentication engine 106 may provide web services to one or more mobile applications installed on the user computing devices 160. Examples of web services include showing facial imaging data on a web site, uploading facial imaging data that will be used to update authentication database 104, downloading data to run custom analytics, exporting data, and the like. APIs are commonly a collection of one or more computing protocols and/or routines that indicate a software program's or software service's functions, and each function's requisite inputs. For example with reference to FIG. 7, APIs may be used by authorized users of the financial institution to set up initial values of one or more of facial recognition credential records 142, facial gesture credential records 144, and secondary biometric credential records 146. In another example, API's may be used by authorized users of the financial institution to update previously established facial recognition credential records 142, facial gesture credential records 144, and secondary biometric credential records 146. Authorized users may set up user credential records that serve as user-supplied information for authenticating access to a user's account; and users may update user credential records much as customers of financial institutions may update passwords.

In another embodiment, a user may set up user credential records that serve as user-supplied information for authenticating access to a user's account, and may update user credential records similarly to updating a password via user terminal 120. User terminal 120 may implement account administration functions after the user has been authenticated as an authorized user using the method of the present disclosure. In an example, the user may capture a new facial gesture using imaging sensor 122, and the user terminal may upload a facial gesture credential record to authorization server 120 to include in the facial gesture credential records 144 associated with the user's account. Additionally, the user may set up a plurality of user cues, such as facial gesture cues and biometric cues. During set-up, given user cues may be associated with given user credential records. In an exemplary embodiment, a given facial gesture credential record configured by the user during set up may be representative of a given secret facial gesture, and an associated facial gesture cue configured by that user during set up prompts the user to execute the given secret facial gesture. In a feature analogous to password mnemonics, in configuring facial gesture cues during set up, the user may customize each facial gesture cue to help the user remember a secret facial gesture associated with the cue, without expressly describing the secret facial gesture in a way that would be recognized by third parties.

At a first image authentication stage, one or more imaging sensor 122 at the ATM or other user terminal 120 captures first imaging data including a first facial image of the user. The system employs facial recognition techniques to seek to associate the first facial image of the user with facial recognition credentials stored in the authentication database 104 for the bank's customers (authorized users).

Vision-based techniques for facial recognition can vary in the number of cameras used; their speed and latency; the imaging environment (restrictions such as lighting); low-level features used (edges, regions, silhouettes, moments, histograms); whether 2-D or 3-D representation is used; and whether time is represented. There is an inherent loss in information whenever a 3-D image is projected to a 2-D plane. Vision-based techniques can handle properties such as texture and color in facial recognition. Desirably, the image(s) provided by imaging sensor 122 should be of sufficient resolution, clarity, and focus to enable the algorithms to adequately match the image to a facial recognition credential for an authorized user.

Embodiments of the invention may include passive or active operation of the imaging sensors 122 to obtain one or more user facial image of suitable quality for facial recognition. When employing facial recognition in a passive manner, at the first authentication stage a customer will be passively authenticated through facial recognition based upon first image data captured automatically by one or more camera at the user terminal 120. The camera 122 in this example would be positioned on the user terminal 120 such that a user likely will be at least partially included in the field of view (e.g., field of view 400 in FIG. 4) when the person is interacting with the user terminal 120, such as by looking and/or interacting with a display screen or other output device 124 of the user terminal. It should be understood, however, that imaging sensor 122 may include additional and/or alternative cameras 122 placed in similar or alternative locations in accordance with various embodiments, and that information from any or all of these cameras can be analyzed as appropriate. Alternatively, in an active mode, the system may, for example, ask the customer to face the camera(s) 122 during authentication proceedings.

In an embodiment, the system 100 analyzes a detected facial image of a user within first imaging data captured by imaging sensor 122 using one or more facial recognition algorithms to attempt to identify the person contained in the image. This can include identifying unique or distinguishing points, landmarks, geometric shapes or distances, or other such features on the face, which can be compared or mapped against information stored in authentication database for authorized users, e.g., customers of a financial institution. Example facial recognition algorithms can include, for example, a linear discriminate analysis algorithm, a Fisherface algorithm, a Hidden Markov model-based algorithm, a principal component analysis algorithm, and a neuronal motivated dynamic link matching algorithm, among others.

In an embodiment, the imaging sensor 122 captures video information and/or a series of still images over a period of time sufficient to detect normal variations in facial images. In at least some embodiments, the video or image capture can occur during the performance of the facial recognition process on an initial image or video frame, etc. In another embodiment, the facial recognition algorithms may utilize a face or head detection algorithm to attempt to locate an approximate head or face position 420 in a captured image or video frame 400. Isolation of the person's face can improve results in at least some embodiments in facial recognition techniques that attempt to detect color variations in the person's face.

A facial recognition algorithm can take an amount of time to analyze an image, such that other processes can be executed during the analysis. In an embodiment, facial recognition processes associated with a first factor of the multi-factor facial image authentication method can be carried out in parallel with image capture and recognition procedures associated with a second factor of the present multi-factor image facial authentication method.

At a second image authentication stage, one or more imaging sensor 122 at the ATM or other user terminal 120 captures second imaging data including a second facial image of the user. The system employs gesture recognition techniques to seek to associate the second facial image of the user with facial gesture credentials stored in the authentication database 104 for authorized users.

Gestures are expressive, meaningful body motions involving physical movements of the fingers, hands, arms, head, face, or body. Gestures may be made with the intent of conveying meaningful information or interacting with the environment. Facial gestures may convey affective information, such as looks of surprise, happiness, disgust, fear, anger, sadness, contempt, etc. As used in the present application, facial gestures include poses and movements of the head and/or of the face.

There have been varied approaches to handle gesture recognition, ranging from mathematical models based on hidden Markov chains to approaches based on soft computing. In the case of facial gestures, devices that sense head or face position and orientation, direction of gaze, facial expression, movement and displacement of facial features, among other aspects, can be used to capture and model such gestures. The present system and method captures and analyzes images of a user's head and/or face, herein called "facial images", to recognize facial gestures.

Figure 4:
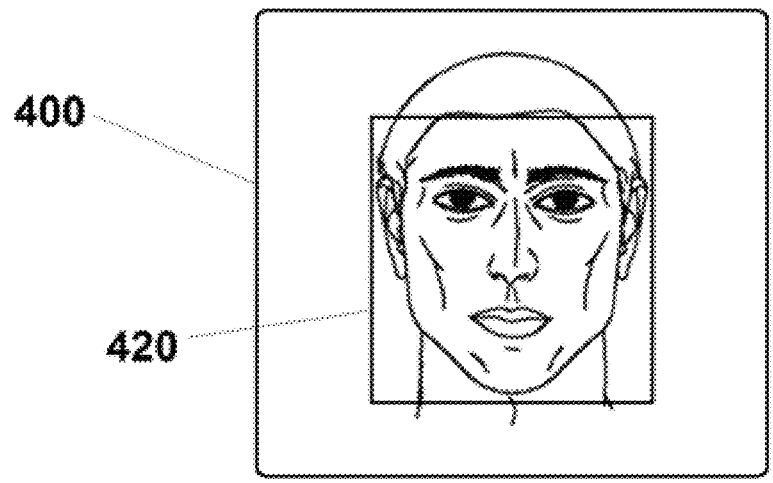
FIG. 4 is a plan view of an imaging sensor field of view with facial image capture area, according to an embodiment.
Figure 5:
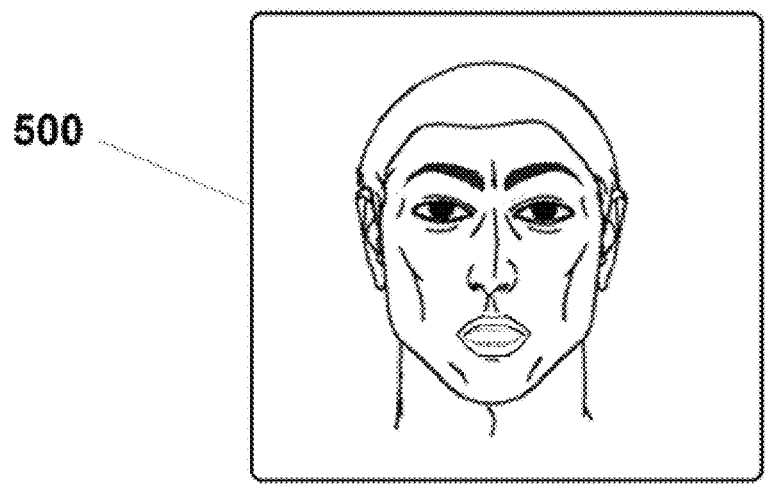
FIG. 5 is a plan view of capture by a still imaging sensor of a facial image including a static facial gesture, according to an embodiment.

Facial gestures can be static, in which a facial image assumes a certain pose or configuration. FIG. 5 illustrates a static facial gesture. As compared with the facial image 400 of FIG. 4, the facial gesture shown in the facial image 500 of FIG. 4 is a pose in which the user has opened his mouth and raised his eyebrows (i.e., the static facial gesture includes two facial features).

Figure 6A:
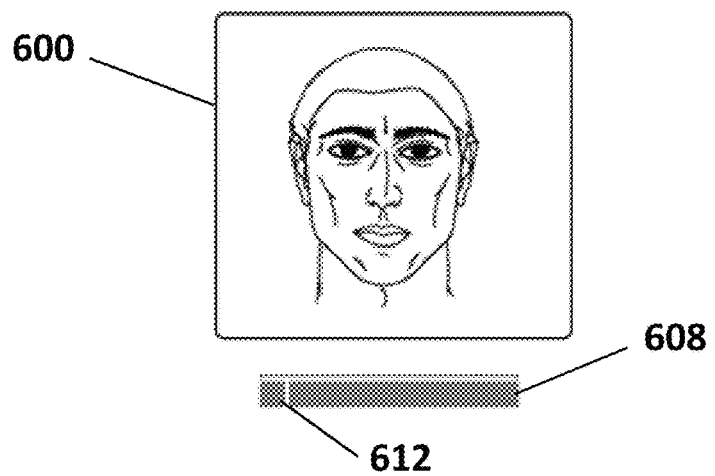
FIG. 6A is a plan view of capture by a video imaging sensor of a first facial image frame including a dynamic facial gesture, according to an embodiment.
Figure 6B:
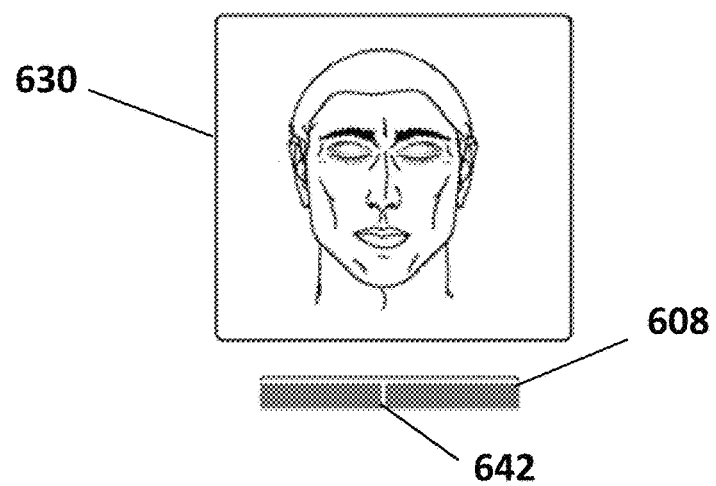
FIG. 6B is a plan view of capture by a video imaging sensor of a second facial image frame including a dynamic facial gesture, according to the embodiment of FIG. 6A.
Figure 6C:
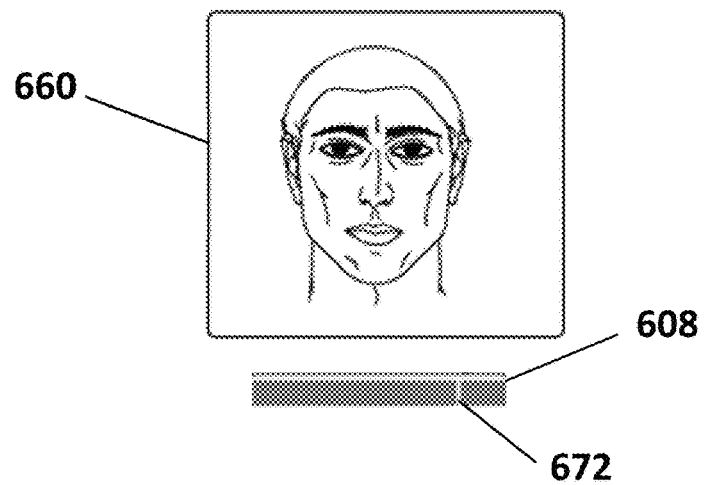
FIG. 6C is a plan view of capture by a video imaging sensor of a third facial image frame including a dynamic facial gesture, according to the embodiment of FIG. 6A.

Facial gestures also can be dynamic, in which a facial image changes configuration over a time period during which a video facial image, or multiple still facial images, are captured. FIGS. 6A-6C illustrate a dynamic facial gesture. FIGS. 6A-6C show a series of three exemplary frames 600, 630, 660 from a video captured by an imaging sensor 122 including a video camera. The video camera 122 captures a video segment of a user over a time period of image capture, including a series of frames showing facial features of the user at different points in time in a time bar 608. The frame 600 of FIG. 6A was captured at a first time shown in the time indicator 612; the second frame 630 of FIG. 6B was captured at a second, later time shown in the time indicator 642; and the third frame 660 of FIG. 6C was captured at a third, still later time shown in the time indicator 672. During this time interval the user carried out a dynamic facial gesture of closing his eyes, then opening his eyes.

In an embodiment, the system 100 facilitates recognition of continuous dynamic facial gestures via temporal segmentation. The facial gesture recognition algorithm may specify start and end points of a gesture in terms of the frames of movement, in time, in space, or in both time and space. Geometric aspects of facial gesture recognition may include spatial information, i.e., where the gesture occurs, and pathic information, i.e., the path a dynamic gesture takes.

Examples of facial gestures that may be captured and recognized in the second factor of the present user authentication method include gestures of the user's eyes, such as opening eyes, closing eyes, raising eyebrows, widening eyes, narrowing eyes, blinking, winking, glaring, rolling eyes, wearing glasses, removing glasses, and gazing in given direction. Exemplary facial gestures also include gestures of the user's mouth, such as opening mouth, closing mouth, smiling, frowning, sneering, pursing lips, biting lip, and baring teeth. Additional examples include facial gestures involving other facial features or of the head as a whole, such as flaring nostrils, grimacing, nodding head upward, nodding head downward, shaking head, turning head to right, and turning head to left.

Facial gestures also include combinations of gestures. For example, facial gestures include a combination of gestures involving multiple facial features, such as a posed facial gesture of the user's eyes and a posed facial gesture of the user's mouth. Facial gestures also include a sequence of gestures involving the same facial feature, such as a sequence of dynamic facial gestures of the user's eyes.

Figure 11:
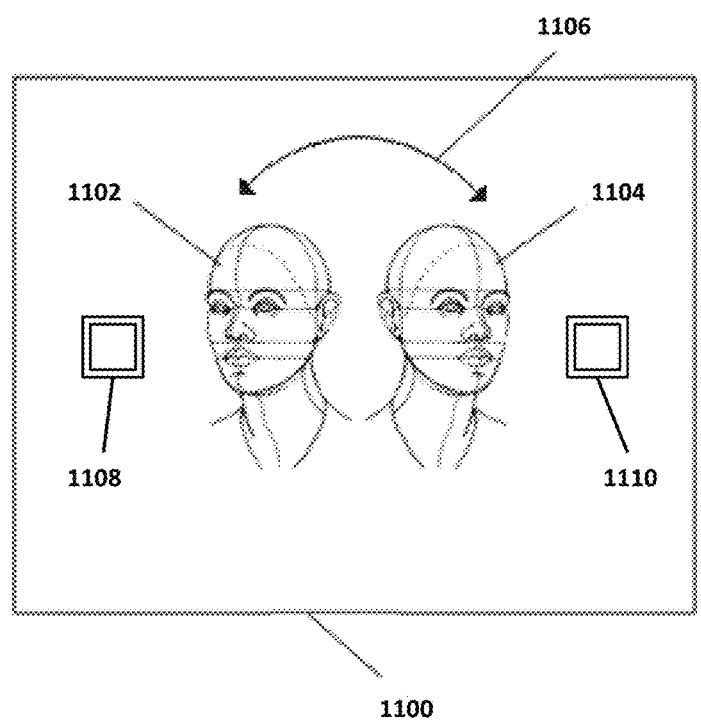
FIG. 11 is a functional diagram illustrating a combination of dynamic facial gestures, according to an exemplary embodiment.

FIG. 11 illustrates a facial image 1100 including a sequence of dynamic facial gestures. The facial gestures consist of movement (path 1106) of a user's head from an orientation 1102 facing to the left to an orientation 1104 facing to the right, followed by the reverse movement of the user's head from the orientation 1104 facing to the right back to the orientation 1102 facing to the left. The system may prompt these facial gestures using a facial gesture cue including icons 1108 and 1110 respectively located at left and right sides of a display screen. The facial gesture cue also can include instructions (not shown) to face location 1108 and turn the head to face location 1110, then turn the head back to face the initial location 1108.

Static gesture (pose) recognition algorithms may use techniques such as template matching, standard pattern recognition, and neural networks. One pattern recognition approach is local feature matching, in which discrete local (geometrical) features, such as irises and nostrils, are extracted for retrieving and identifying faces. Another pattern recognition approach is full face template matching, which can employ gray-level template matching using global recognition. A feature vector may be used to represent a full face template.

Recognition techniques for dynamic facial gestures can be more complex than recognition techniques for posed facial gestures. Dynamic gesture recognition algorithms may use techniques such as time-compressing templates, dynamic time warping, hidden Markov models (HMMs), and time delay neural networks (TDNNs).

In an embodiment, facial gesture recognition algorithms extract sensitive features from facial landmarks such as regions surrounding the mouth, nose, and eyes of a normalized image. In the case of dynamic facial gestures, the algorithm may track image frames of these regions to generate suitable features. The recognition algorithm may characterize location, intensity, and dynamics of facial features to recognize a facial gesture.

In an embodiment, the user authentication system 100 carries out a facial recognition procedure based on express instructions displayed by the terminal to perform a given facial gesture, i.e., an overt facial gesture cue. The overt facial gesture cue may be selected from a plurality of facial gesture cues stored by financial institution as facial recognition templates, using facial recognition algorithms of a user carrying out a given facial gesture (herein called modified facial recognition algorithms). By requiring that the user carry out a facial gesture selected by the authentication engine 106, an unauthorized user cannot easily "spoof" the modified facial recognition algorithm using an artificial two dimensional image (e.g., picture, photograph, etc.) of an authorized user.

In this embodiment, modified facial recognition algorithms compare the captured imaging data with one or more facial recognition template stored by the processor corresponding to the cued facial gesture. In one embodiment, modified facial recognition algorithms compare the first imaging data with facial recognition templates stored for authorized users as facial recognition credentials. For example, during system set-up the user authentication system 100 can require authorized users to record facial recognition credentials performing a set of standard facial gestures, and the system can select one of these facial recognition credentials in cueing the facial gesture and in modified facial recognition algorithms of the captured imaging data.

In another embodiment, modified facial recognition algorithms compare the captured imaging data with general facial recognition credentials stored for authorized users (i.e., facial recognition templates without a facial gesture), but adjust the facial recognition algorithms in accordance with one or more facial recognition template corresponding to the cued facial gesture. In this embodiment, the system may employ intrapersonal facial recognition techniques to the captured imaging data. Intrapersonal facial recognition techniques are techniques for distinguishing among different facial images for the same person. For example, if the system displays a facial gesture cue instructing the user to close his eyes, the processor may employ modified facial recognition algorithms that assume that the user's irises are not visible in the captured imaging data.

Figure 8:
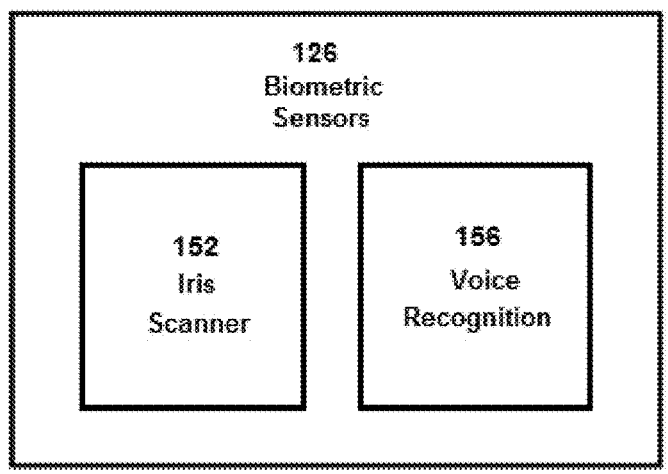
FIG. 8 is a block diagram illustrating biometric sensors of a biometric sensors module, according to the embodiment of FIG. 1.

In the multi-factor user authentication method of the invention, biometric credentials may serve as a third authentication factor for additional security, in addition to first and second authentication factors based upon facial imaging. As seen in FIG. 8, exemplary biometric sensors 126 include iris scanner 152 and voice recognition sensor 156. The present authentication method compares secondary biometric data captured by one or more biometric sensor 126 with secondary biometric credential records stored by the authentication database 104 for authorized users. For example, a voice recognition algorithm may compare user speech captured by voice recognition sensor 156 with recorded speech of an authorized user, to detect a particular user's pattern of vocal sounds, to detect a predetermined vocal communication of the authorized user, or both.

Methods for Authenticating User Accessing a Financial Account at a User Terminal In some embodiments, one or more computing devices perform a plurality of processes that are part of a system for authenticating user access to financial accounts. While the blocks in the disclosed processes are shown in a particular order, the actual order may differ. In some embodiments, some steps may be performed in parallel.

Figure 2:
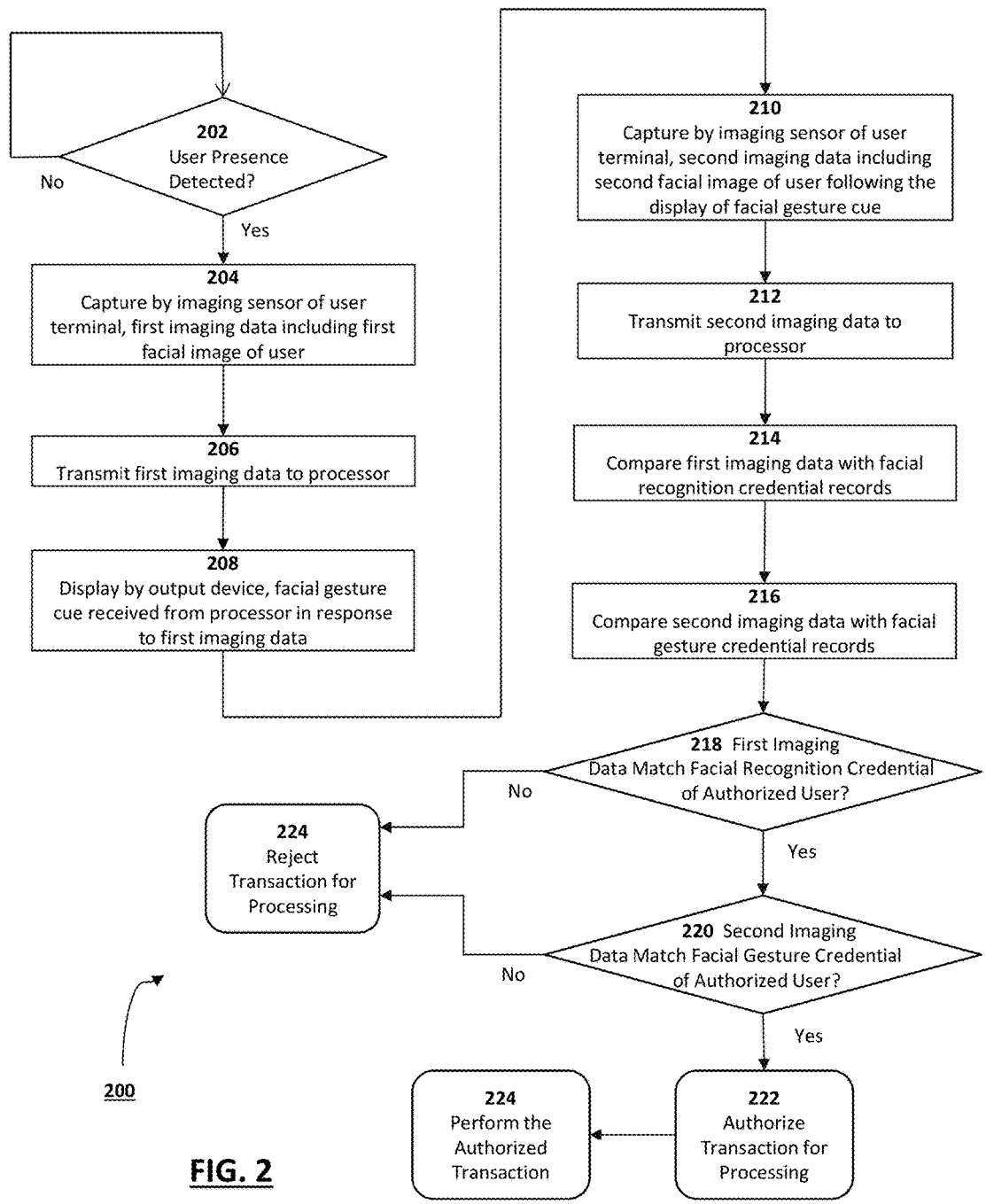
FIG. 2 is a flowchart of an exemplary method for authenticating a user accessing a financial account from a user terminal, according to an exemplary embodiment.

FIG. 2 is a flowchart showing a process 200 for authenticating a user accessing a financial account at a user terminal using multi-factor image authentication, according to an exemplary embodiment. In the event the process 200 authenticates the user as having a financial account (also referred to as an account at a financial institution), the process authorizes the user to perform one or more transactions at the user terminal.

In an embodiment, the plurality of steps included in process 200 may be performed by one or more computing devices or processors in the system described in 100. In an embodiment, the plurality of steps included in process 200 may be performed by a processor in operative communication with a user terminal configured to operate with an ATM protocol. In an embodiment, the plurality of steps included in process 200 may be performed by an authentication server of a financial institution in operative communication with a memory, such as the authentication server 102 of FIG. 1.

The authentication process 200 can be activated in response to detecting the presence of a user at the user terminal. In a first step 202, a processor (such as authentication server 102) in operative communication with the user terminal detects the presence of a user at the user terminal, such as by detecting a user input indicating a person attempting to access data or functionality on the user terminal, or by detecting a person coming within a field of view of an imaging sensor of the user terminal. Upon detecting presence of a user at the user terminal, the processor triggers the first authentication step of the multi-factor image authentication.

In an embodiment of the step 202, the processor detects insertion of an access card at a card reader 134 of the user terminal. In an embodiment of step 202, the processor detects a user input at a touch screen 132 of the user terminal. In another embodiment of step 202, the processor detects a user input to an input control of the user terminal, such as pressing one or more button at the user terminal 120. In a further embodiment of step 202, the processor detects communication of a user's mobile device with the user terminal. These various embodiments are examples of detecting the presence of a user via receiving a user input. In another embodiment, the processor 102 detects the presence of a user by detecting the user entering the field of view of the imaging sensor 122.

After detecting the presence of a user at step 202, the method proceeds to step 204. In the event the system does not detect the presence of a user at step 202, the process continues to monitor one or more mechanisms of the user terminal 120 for detecting the presence of a user.

At step 204, the method captures first imaging data via an imaging sensor of user terminal 120. The first imaging data includes a first facial image of the user. For example, as seen in FIG. 4, an imaging sensor may capture a facial image at a capture area 420 within a field of view 400 of an imaging sensor. In an embodiment, the imaging sensor is a single, front facing camera at the user terminal. In another embodiment, the imaging sensor is multiple front facing cameras at the user terminal. The multiple front facing cameras may have overlapping fields of view to provide additional image capture capability. In an embodiment of step 204, the imaging sensor is a still camera that captures a single still image. Alternatively a still camera may be operated sequentially to capture a plurality of still images at different points in time within a time period of capturing the first imaging data. In another embodiment of step 204, the imaging sensor is a video camera that captures multiple image frames over a period of time of capturing the first imaging data.

At step 206, the imaging sensor transmits the first imaging data to the processor. Upon receipt of the first imaging data, processor may initiate facial recognition algorithms, comparing the first imaging data including the first facial image of the user with facial recognition credentials of authorized users stored by the processor. A facial recognition algorithm can take an amount of time to analyze an image, such that other processes can be executed during the analysis. In the process 200 of FIG. 2, facial recognition processing of the first imaging data can be carried out in parallel with image capture of second imaging data and facial gesture recognition procedures.

On the other hand, in certain embodiments of the process 200, expedited facial recognition processing of the first imaging data matches the first facial image of the user with an authorized user before displaying a facial gesture cue at step 208. Thereby, the method can select a facial gesture cue associated with the authorized user that was matched to first facial image. This knowledge enables authentication procedures such as the display of a facial gesture cue representing a secret facial gesture known only to the authorized user. Thus, although the step 214 of comparing the first imaging data with facial recognition credential records is shown in FIG. 2 at a later stage of the process, this step may be carried out as soon as the system has transmitted the first imaging data to the processor at 206.

At step 208, the output device of the user terminal displays a facial gesture cue received from the processor in response to the transmission of the first imaging data at step 206. The output device of the user terminal may be a visual output device such as a display screen, an audio output device such as a speaker, or a device that provides both audio and visual outputs. As used in the present application, the "display" of the facial gesture cue may be a visual display, an audio display, or both.

The facial gesture cue displayed at step 208 serves to alert the user to the need to make a facial gesture, and provides the user with information on what facial gesture should be made. In an embodiment, the facial gesture cue may provide instructions on when the facial gesture should start, and information on the duration of capture of the second facial image including the facial gesture. In an embodiment, the facial gesture cue may indicate whether the facial gesture should be a posed facial gesture or a dynamic facial gesture.

In one embodiment of step 208, the facial gesture cue includes an instruction to carry out an overt facial gesture. An overt facial gesture is a facial gesture that is apparent to any viewer (or listener) of the facial gesture cue, and that does not depend on secret knowledge of the user. An example of an overt facial gesture cue is: "within the next five seconds, close your eyes, then open your eyes". Overt facial gestures can make it difficult if not impossible for fraudulent users, who may have been able to "spoof" the first authentication factor by obtaining a high resolution image of an authorized user, to satisfy the second authentication factor. It would be much more difficult, if not impossible, to obtain or generate an image of the authorized user engaged in the facial gesture. This is particularly true if the facial gesture recognition method makes use of a facial image of the authorized user engaged in the required facial gesture, wherein the facial image was provided to the authentication service 100 by the authorized user during set-up and stored as a facial recognition credential in the authentication database 104.

In another embodiment of step 208, the facial gesture cue includes an instruction to carry out a secret facial gesture. A secret facial gesture is a facial gesture that is not apparent to any viewer (or listener) of the facial gesture cue, but depends on secret knowledge of an authorized user. There can be many ways to indicate a secret facial gesture to a user, including for example secret temporal limitations (e.g., "make your facial gesture for this week"); selection from a list of secret gestures (e.g., "make your second facial gesture"), or a facial gesture that is identified by any other information known only to the authorized user. Secret facial gestures can provide additional security associated with authentication factors based upon secret knowledge.

At step 210, the imaging sensor captures second imaging data including a second facial image of the user upon the display of the second facial cue. As used herein, capture of imaging data "upon" the display of the user cue (e.g., facial gesture cue) means that capture occurs during the display of the user cue or very soon after display of the user cue, or capture occurs both during and after display of the user cue. As described above, the system may provide the user information on a time frame within which to make the second facial gesture. The system may use similar techniques to capture the second facial image as used to capture the first facial image. Alternatively, the system may use special imaging techniques for more sensitive capture of particular features of the user's face or head that have a spatial or pathic relationship to the required facial gesture. At step 212, the user terminal transmits the second imaging data to the processor.

At step 214, the processor compares the first imaging data with facial recognition credential records stored by the processor. As noted above, to allow additional time for facial recognition algorithms, facial recognition processing of the facial recognition data can commence when the processor receives the first imaging data at step 206 and can be effected in parallel with steps 208, 210, 212 and 214. Various facial recognition techniques may be employed, consistent with the fact that this first comparison (first authentication factor) involves recognition of a normal facial image of the user, without executing any special facial gesture.

At step 216, the system compares the second imaging data with facial gesture credential records stored by the processor. Various facial gesture recognition techniques may be employed, as previously described. In one embodiment of step 216, the facial gesture employed at step 214 depend on the results of the facial recognition process applied at 214 to the first imaging data. For example, the facial gesture recognition techniques may make use of a facial gesture credential corresponding an image of the authorized user engaged in the required facial gesture, stored by the processor for an authorized user that was identified at step 214. Alternatively, in the absence of a stored image of the authorized user engaged in the required facial gesture, the system may employ known intrapersonal facial recognition techniques to the second facial image. Intrapersonal facial recognition techniques are techniques for distinguishing among different facial images for the same person.

In a further embodiment of step 216 that may be employed in the case of a secret facial gesture, the system may use general facial gesture recognition techniques to detect the required facial gesture in the second facial image without attempting to recognize the second facial image as that of the authorized user. An example of this embodiment would be a data comparison that seeks simply to confirm that the second facial image matches a human face with eyes closed. This embodiment would use more generalized second facial gesture credential records in the comparison, such as general local feature matching templates, and could facilitate the second imaging data comparison (second authentication factor) at step 216.

If the system does not match the first imaging data with the first facial image of the user to facial recognition credentials of an authorized user at 218, the method rejects the transaction for processing 224. If the system successfully matches the first imaging data with the first facial image of the user to facial recognition credentials of an authorized user at 218, but does not match the second imaging data with a facial gesture credential associated with the authorized user at 220, the method rejects the transaction for processing 224. If the system successfully matches the first imaging data with the first facial image of the user to facial recognition credentials of an authorized user at 218, and successfully matches second imaging data with a facial gesture credential associated with the authorized user at 220, the method authorizes the transaction for processing at 222.

Upon authorization of the user transaction for processing at 222, the user terminal activates the authorized transaction at 224. The authorized transaction can include one or more of withdrawing cash, depositing money, making a payment, effecting a money transfer, and providing account information for the authorized user's account. In one embodiment, the user terminal activates a dispensing of cash from the user terminal based on authorization of a cash withdrawal transaction.

Figure 3:
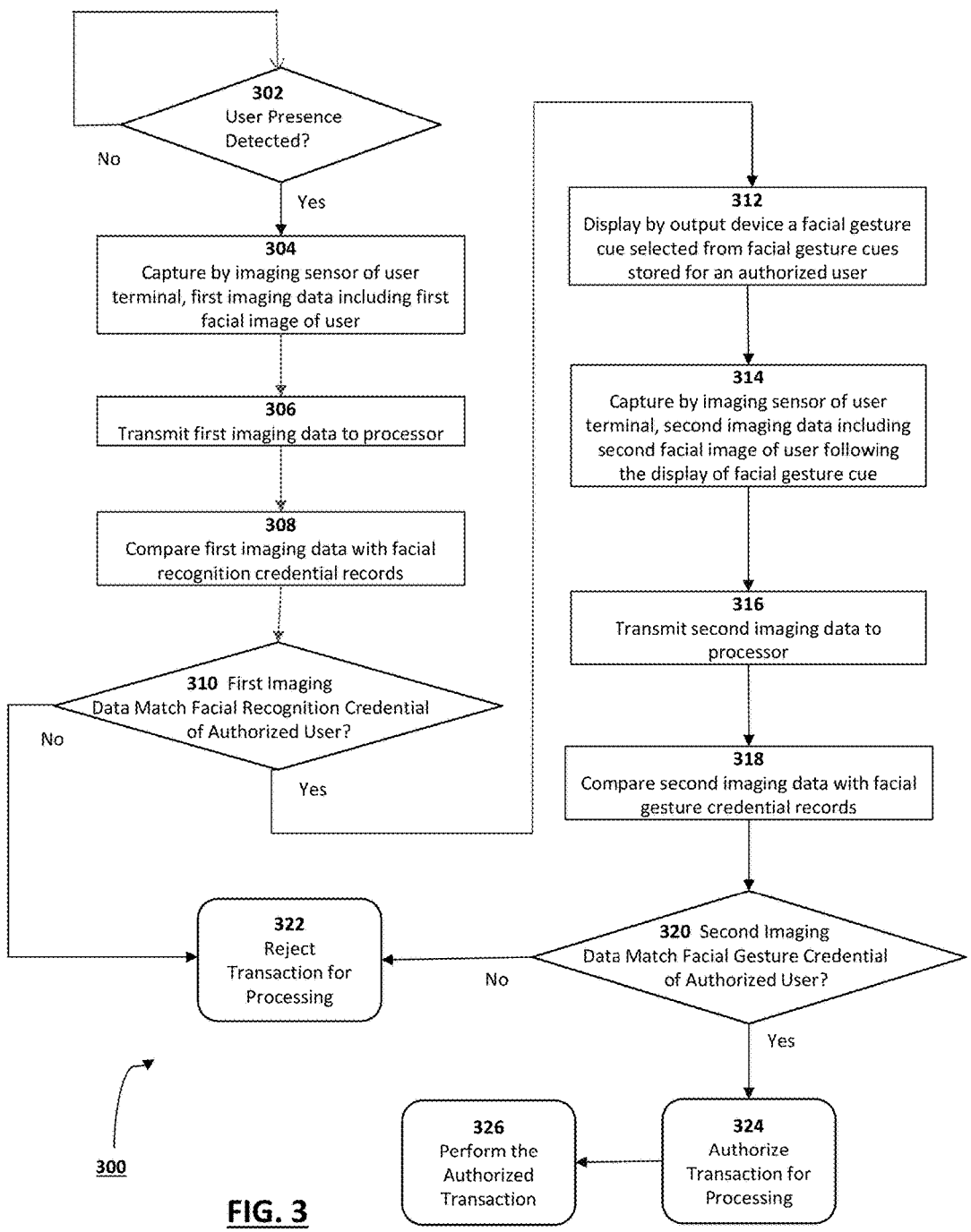
FIG. 3 is a flowchart of an exemplary method for authenticating a user accessing a financial account from a user terminal, according to an exemplary embodiment.

FIG. 3 is a flowchart showing a process 300 for authenticating a user accessing a financial account at a user terminal using multi-factor image authentication, according to an exemplary embodiment. In the event the process 300 authenticates the user as having a financial account (also referred to as an account at a financial institution), the process authorizes the user to perform one or more transactions at the user terminal. A number of steps of process 300 correspond to steps of the process 200 of FIG. 2, and reference can be had to the discussion of process 200 to obtain additional details and embodiments of corresponding steps.

The process 300 contrasts to process 200 in requiring a successful match of the first imaging data with a facial recognition credential of an authorized user (first authentication factor), as a prerequisite for the second stage of authentication or second authentication factor. In the process 200, by comparison, optionally the first authentication factor may be processed in parallel with processing the second authentication factor. An advantage of the process 200 is that parallel authentication processing may expedite the overall authentication process. On the other hand, an advantage of the process 300 is that identification of an authorized user at an early stage of the process enables the use of various intrapersonal image authentication techniques in the second authentication stage.

In an embodiment, the plurality of steps included in process 300 may be performed by one or more computing devices or processors in the system described in 100. In an embodiment, the plurality of steps included in process 300 may be performed by a processor in operative communication with a user terminal configured to operate with an ATM protocol. In an embodiment, the plurality of steps included in process 300 may be performed by an authentication server of a financial institution in operative communication with a memory, such as the authentication server 102 of FIG. 1.

The authentication process 300 can be activated in response to detecting the presence of a user at the user terminal. In a first step 302, a processor (such as authentication server 102) in operative communication with the user terminal detects the presence of a user at the user terminal, such as by detecting a user input indicating a person attempting to access data or functionality on the user terminal, or by detecting a person coming within a field of view of an imaging sensor of the user terminal. Various embodiments of detecting the presence of a user are discussed for the step 202 of FIG. 2. After detecting the presence of a user at step 302, the method proceeds to step 304. In the event the system does not detect the presence of a user at step 302, the process continues to monitor one or more mechanisms of the user terminal 120 for detecting the presence of a user.

At step 304, the method captures first imaging data via an imaging sensor of user terminal 120. The first imaging data includes a first facial image of the user. In an embodiment of step 304, the imaging sensor is a still camera that captures a still image at a time of capturing the first imaging data. In another embodiment of step 304, the imaging sensor is a video camera that captures multiple image frames over a period of time of capturing the first imaging data. Additional embodiments of step 304 are discussed for step 204 of FIG. 2.

At step 306, the imaging sensor transmits the first imaging data to the processor. At step 308, upon receipt of the first imaging data, the processor initiates facial recognition algorithms, comparing the first imaging data including the first facial image of the user with facial recognition credentials of authorized users stored by the processor. In the process 300, facial recognition processing of the first imaging data matches the first facial image of the user with an authorized user before displaying a facial gesture cue at step 312.

At step 310, if the system determines that the first imaging data does not match a facial recognition credential of any authorized user, the method rejects the transaction for processing 322. If the system determines that the first imaging data successfully matches a facial recognition credential of an authorized user at 310, the method proceeds to step 312. The second stage of the multi-factor authentication process starting with step 312 can use the identification of a particular authorized user in further authentication procedures.

At step 312, the output device of the user terminal displays a facial gesture cue received from the processor in response to the transmission of the first imaging data at step 206. In an embodiment, the selected facial gesture cue is selected from a plurality of facial gesture cues stored by the system for the authorized user that was identified at step 310.

The facial gesture cue displayed at step 312 serves to alert the user to the need to make a facial gesture, and provides the user with information on what facial gesture should be made. In an embodiment, the facial gesture cue may provide instructions on when the facial gesture should start, and on the duration of capture of the second facial image of the user. In an embodiment, the facial gesture cue may indicate whether the facial gesture should be a posed facial gesture or a dynamic facial gesture.

In one embodiment of step 312, the facial gesture cue includes an instruction to carry out an overt facial gesture. An overt facial gesture is a facial gesture that is apparent to any viewer (or listener) of the facial gesture cue, and that does not depend on secret knowledge of the user. In another embodiment of step 312, the facial feature cue includes an instruction to carry out a secret facial gesture. A secret facial gesture is a facial gesture that is not apparent to any viewer (or listener) of the facial gesture cue, but depends on secret knowledge of an authorized user. Secret facial gestures can provide additional security because of the strength of authentication based upon secret knowledge. Additional aspects and examples of overt facial gestures and secret facial gestures are discussed as to step 208 of FIG. 2.

At step 314, the imaging sensor captures second imaging data including a second facial image of the user upon the display of the second facial cue. As described above, the system may provide the user information on a time frame within which to make the second facial gesture. The system may use similar techniques to capture the second facial image as used to capture the first facial image. Alternatively, the system may use special imaging techniques for more sensitive capture of particular features of the user's face or head that have a spatial or pathic relationship to the required facial gesture. At step 316, the user terminal transmits the second imaging data to the processor.

At step 318, the system compares the second imaging data with facial gesture credential records stored by the processor. Various facial gesture recognition techniques may be employed, as previously described. In one embodiment of step 318, the facial gesture employed at step 318 depend on the results of the facial recognition process applied at 310 to the first imaging data. For example, the facial gesture recognition techniques may make use of a facial gesture credential corresponding an image of the authorized user engaged in the required facial gesture, stored by the processor for an authorized user that was identified at step 310.

In a further embodiment of step 318 that may be employed in the case of a secret facial gesture, the system may use general facial gesture recognition techniques to detect the required facial gesture in the second facial image without attempting to recognize the second facial image as that of the authorized user. An example of this embodiment would be a data comparison that seeks simply to confirm that the second facial image matches a human face with eyes closed. This embodiment would use more generalized second facial gesture credential records in the comparison, such as general local feature matching templates, and could facilitate the second imaging data comparison (second authentication factor) at step 318.

Further steps of the process reflect that the method previously successfully matched the first facial image to a facial recognition credential of an authorized user at step 310. If the system does not match the second imaging data with the second facial image of the user to facial gesture credentials of the authorized user at 320, the method rejects the transaction for processing 322. If the system successfully matches the second imaging data with the second facial image of the user to facial gesture credentials of the authorized user at 320, the method authorizes the transaction for processing at 324.

Upon authorization of the user transaction for processing at 324, the user terminal performs the authorized transaction at 326. The authorized transaction can include one or more of withdrawing cash, depositing money, making a payment, effecting a money transfer, and providing account information for the authorized user's account. In one embodiment, the user terminal activates a dispensing of cash from the user terminal based on authorization of a cash withdrawal transaction.

Figure 9:
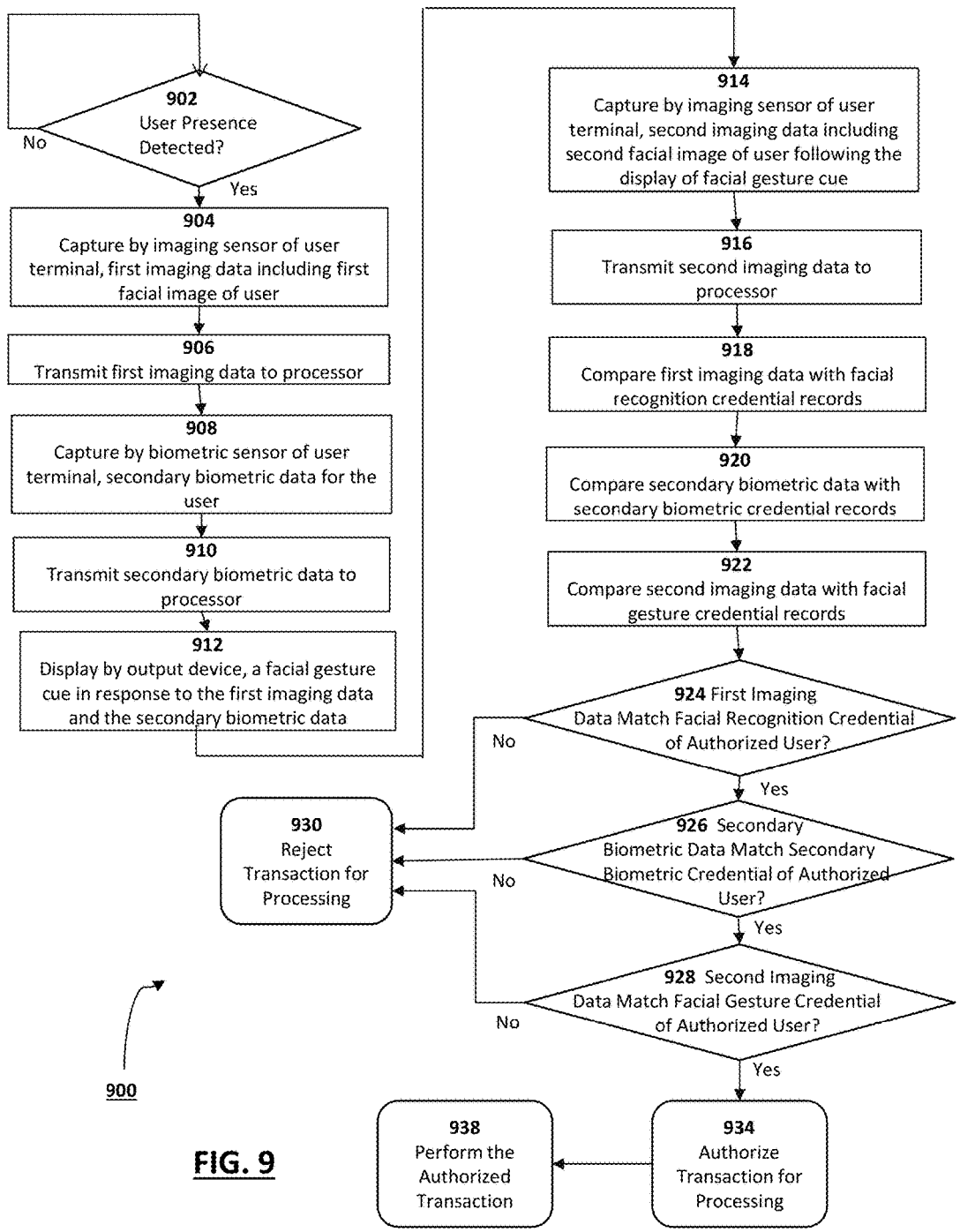
FIG. 9 is a flowchart of an exemplary method for authenticating a user accessing a financial account from a user terminal, according to an exemplary embodiment.

FIG. 9 is a flowchart showing a process 900 for authenticating user access to a financial account at a user terminal using multi-factor image authentication, according to an exemplary embodiment. The process 900 includes additional steps relating to a third authentication factor for user authentication, involving secondary biometric authentication. In the following discussion, generally only the additional steps relating to biometric authentication are described. The other steps of process 900 correspond to various steps of the process 200 of FIG. 2, and reference should be had to the discussion of process 200 for a description of these corresponding steps.

At step 908, following capture and transmission to the processor of the first imaging data, a biometric sensor of the user terminal captures secondary biometric data of the user. In an embodiment of step 908, the user terminal includes one or more biometric sensors to provide one or more authentication factor in addition to facial imaging using the imaging sensor(s). In an embodiment, the biometric sensor includes an iris scanner. In another embodiment, the biometric sensor includes a voice recognition sensor. At step 910, the user terminal transmits the captured secondary biometric data to the processor.

At step 920, the processor compares the secondary biometric data transmitted at step 910 with secondary biometric credential records stored at the processor for authorized users (e.g., module 146 in authentication database 104). In an example, a voice recognition algorithm compares user speech captured by a voice recognition sensor with recorded speech of an authorized user, to detect a particular user's pattern of vocal sounds, to detect a predetermined vocal communication of the authorized user, or both.

Steps 924, 926 and 928 implement a three-factor authentication process that includes the secondary biometric sensor data as a third factor and that requires success of all three factors in order to authenticate the user. If the system does not match the first imaging data with the first facial image of the user to facial recognition credentials of an authorized user at 924, the method rejects the transaction for processing 930. If the system successfully matches the first imaging data with the first facial image of the user to facial recognition credentials of an authorized user at 924, but does not match the secondary biometric data with a secondary biometric credential associated with the authorized user at 926, the method rejects the transaction for processing 930. If the system successfully matches the secondary biometric data with a secondary biometric credential associated with the authorized user at 926, but does not match the second imaging data with a facial gesture credential associated with the authorized user at 928, the method rejects the transaction for processing 930. If the system successfully matches all three factors at 924, 926, and 926, the method authorizes the transaction for processing at 934.

Figure 10:
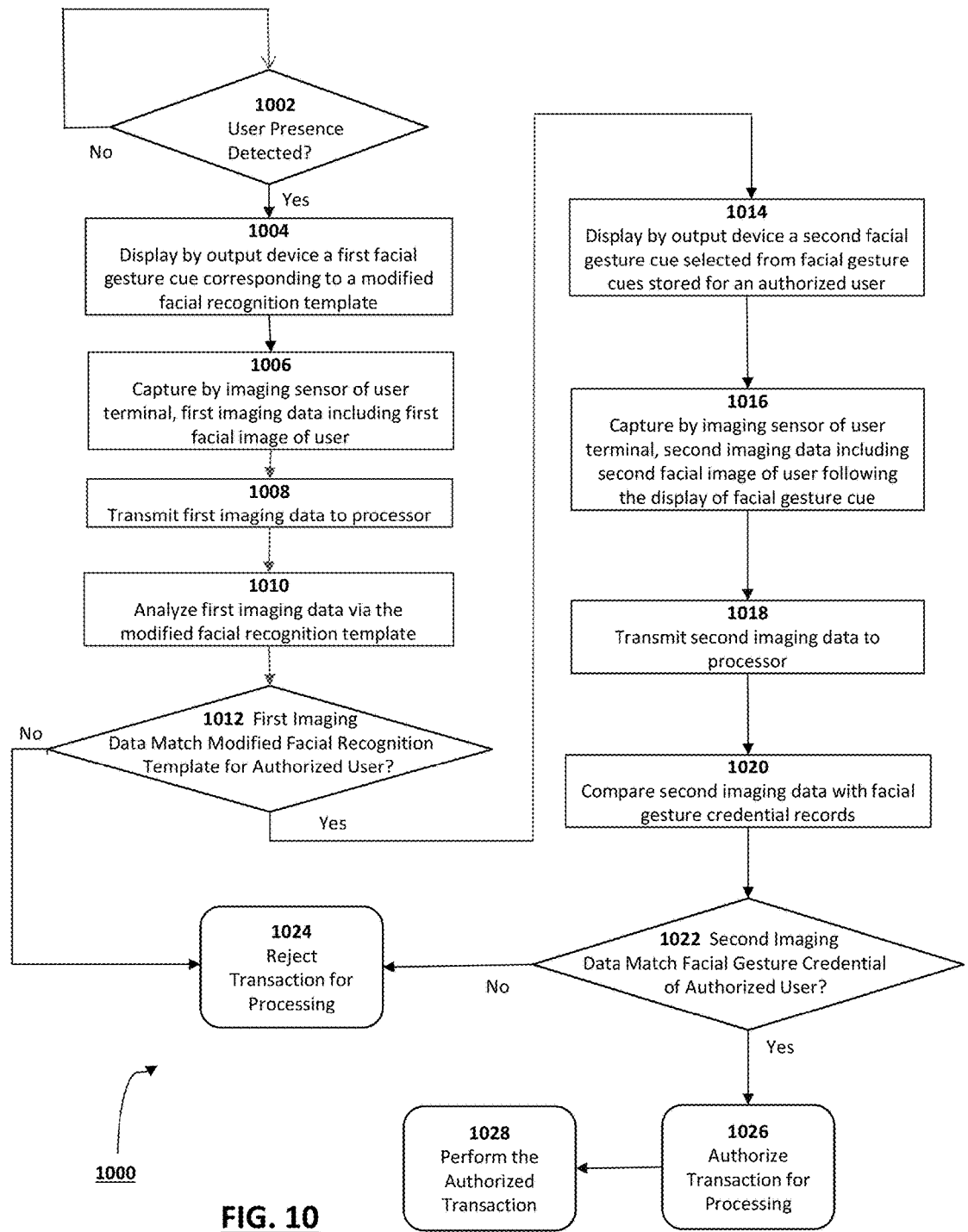
FIG. 10 is a flowchart of an exemplary method for authenticating a user accessing a financial account from a user terminal, according to an exemplary embodiment.

FIG. 10 is a flowchart showing a process 1000 for authenticating a user accessing a financial account at a user terminal using multi-factor image authentication, according to an exemplary embodiment. In the event the process 1000 authenticates the user as having a financial account (also referred to as an account at a financial institution), the process authorizes the user to perform one or more transactions at the user terminal. A number of steps of process 1000 correspond to steps of the process 300 of FIG. 3, and reference can be had to the discussion of process 300 to obtain details and embodiments of corresponding steps.

The process 1000 is like the process 300 in requiring a successful match of the first imaging data facial recognition credential of an authorized user (first authentication factor), as a prerequisite for the second stage of authentication or second authentication factor. As with process 300, an advantage of the process 1000 is that identification of an authorized user at an early stage of the process enables the use of various intrapersonal image authentication techniques in the second authentication stage. The process 1000 contrasts to the process 300 in requiring a facial gesture of the user at the first authentication stage (first facial gesture cue), in addition to another facial gesture of the user at the second authentication stage (second facial gesture cue). The use of facial gestures at both stages of authenticating the user provides additional security at the first (facial recognition) authentication stage.

In an embodiment, the plurality of steps included in process 300 may be performed by one or more computing devices or processors in the system described in 100. In an embodiment, the plurality of steps included in process 300 may be performed by a processor in operative communication with a user terminal configured to operate with an ATM protocol. In an embodiment, the plurality of steps included in process 300 may be performed by an authentication server of a financial institution in operative communication with a memory, such as the authentication server 102 of FIG. 1.

The authentication process 1000 can be activated in response to detecting the presence of a user at the user terminal. In a first step 1002, a processor (such as authentication server 102) in operative communication with the user terminal detects the presence of a user at the user terminal, such as by detecting a user input indicating a person attempting to access data or functionality on the user terminal, or by detecting a person coming within a field of view of an imaging sensor of the user terminal. Various embodiments of detecting the presence of a user are discussed for the step 202 of FIG. 2. After detecting the presence of a user at step 1002, the method proceeds to step 1004. In the event the system does not detect the presence of a user at step 1002, the process continues to monitor one or more mechanisms of the user terminal 120 for detecting the presence of a user.

At step 1004, the output device of the user terminal displays a facial gesture cue received from the processor in response to detecting the presence of a user at step 1002. In an embodiment, the first facial gesture cue is selected from a plurality of facial gesture cues stored by financial institution, wherein the plurality of facial gesture cues correspond to modified facial recognition templates stored by the processor. By requiring that the user carry out a facial gesture, an unauthorized user cannot easily "spoof" the first authentication stage using a two dimensional representation (e.g., picture, photograph, etc.) of an authorized user.

The first facial gesture cue displayed at step 1004 serves to alert the user to the need to make a facial gesture, and provides the user with information on what facial gesture should be made. In an embodiment, the facial gesture cue may provide instructions on when the facial gesture should start, and on the duration of capture of the second facial image of the user. In an embodiment, the facial gesture cue may indicate whether the facial gesture should be a posed facial gesture or a dynamic facial gesture. In an embodiment, the first facial gesture cue is an overt facial gesture cue, i.e., an express instruction to a user viewing the display of the user terminal to perform a given facial gesture.

In an exemplary embodiment, at step 1002 the user detects the presence of a user standing in front of a user terminal including a camera. Upon sensing the presence of the user, at step 1004 the user terminal's output device prompts the user to stand in front of the camera, which captures a live video or a series of images of the user (step 1006). At step 1004 the user terminal displays an instruction of facial gesture to be made. Exemplary instructions include: "blink your eyes", "look up", "open your mouth", "show your teeth", and "nod your head".

At step 1006, the method captures first imaging data via an imaging sensor of user terminal 120. The first imaging data includes a first facial image of the user. In an embodiment of step 1006, the imaging sensor is a still camera that captures a still image of a posed facial gesture performed by the user in accordance with the first facial gesture cue displayed at step 1004. In another embodiment of step 304, the imaging sensor is a video camera that captures multiple image frames over a period of time of dynamic facial gesture performed by the user during that time period in accordance with the first facial gesture cue displayed at step 1004.

At step 1008, the imaging sensor transmits the first imaging data to the processor. At step 1010, upon receipt of the first imaging data, the processor initiates facial recognition algorithms, comparing the first imaging data including the first facial image of the user with one or more modified facial recognition templates stored by the processor. In one embodiment of step 1008, the facial recognition algorithms compare the first imaging data with modified facial recognition templates stored for authorized users as facial recognition credentials. For example, during system set-up the user authentication system 100 can require authorized users to record facial recognition credentials performing a set of standard facial gestures, and the system can select one of these facial recognition credentials in cueing the first facial gesture and recognizing the first imaging data.

In another embodiment of step 1008, the facial recognition algorithms compare the first imaging data with general facial recognition credentials stored for authorized users (i.e., facial recognition templates without a facial gesture), but adjusts the facial recognition algorithm in accordance with a modified facial recognition template corresponding to the first facial gesture credential. For example, if the system displayed a first facial gesture cue instructing the user to close his eyes, the processor may adjust the facial gesture recognition algorithm to take into account that the irises of the user's eyes should not be visible in the first imaging data including the first facial image of the user.

At step 1012, if the system determines that the first imaging data does not match a modified facial recognition template of any authorized user, the method rejects the transaction for processing 1024. If the system determines that the first imaging data successfully matches a modified facial recognition template of an authorized user at 1012, the method proceeds to step 1014. As in process 300, the second stage of the multi-factor authentication process starting with step 1014 can use the identification of a particular authorized user in further authentication procedures.

In an embodiment, steps 1014-1028 correspond to steps 312-326 of the process 300 of FIG. 3. Reference should be had to the discussion of process 300 for details and embodiments of these steps of cueing, capturing, and recognizing second imaging data including a second facial image of the user, as the second authentication factor of process 1000.

In another embodiment of single-factor user authentication using modified facial recognition templates, the second authentication factor (steps 1014 through 1022) may be omitted. In this embodiment, a successful match at step 1012 results in directly authorizing the requested transaction for processing (steps 1026, 1028).

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then", "next", etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A processor-based method, comprising:
   detecting, by a processor in operative communication with a user terminal, presence of a user requesting a cash withdrawal transaction at the user terminal;
   capturing, by an imaging sensor of the user terminal in operative communication with the processor in response to the detecting the presence of the user, first imaging data including a first facial image of the user;
   transmitting, by the user terminal, the first imaging data to the processor;
   determining, by the processor, whether the first imaging data matches a facial recognition credential record for an authorized user included in a plurality of facial recognition credential records stored by the processor;
   selecting, by the processor in the event the first imaging data matches the facial recognition credential record for the authorized user, a facial gesture cue from a plurality of facial gesture cues stored by the processor for the authorized user for display by an output device in operative communication with the processor, wherein the facial gesture cue comprises one or both of verbal information and graphical information that depends on private knowledge of the authorized user to prompt the authorized user to execute a secret facial gesture within a predetermined time duration, wherein the facial gesture cue has a spatial or pathic relationship to the secret facial gesture;
   capturing, by the imaging sensor of the user terminal upon the display of the facial gesture cue, a video containing second imaging data including a second facial image of the user executing a facial gesture within the predetermined time duration;
   transmitting, by the user terminal, the second imaging data to the processor;
   selecting, by the processor, a facial gesture credential record included in a plurality of facial gesture credential records stored by the processor for the authorized user, wherein the selected facial gesture credential record is associated with the selected facial gesture cue and is representative of the secret facial gesture;
   determining, by the processor, whether the second imaging data matches the selected facial gesture credential record; and
   in the event the first imaging data matches the facial recognition credential record for the authorized user and the second imaging data matches the selected facial gesture credential record for the authorized user,
      authorizing, by the processor, the cash withdrawal transaction for processing; and
      activating, by the user terminal, a dispensing of cash from the user terminal based on the cash withdrawal transaction authorized by the processor.

2. The method of claim 1, wherein the user terminal is configured to operate in accordance with an ATM protocol, and the processor is an authentication server of a financial institution in operative communication with a memory.

3. The method of claim 1, wherein second imaging data is static image data, and the facial gesture credential record stored by the processor for the authorized user is representative of a posed facial gesture.

4. The method of claim 1, wherein second imaging data is multi-frame video data, and the facial gesture credential record stored by the processor for the authorized user is representative of a dynamic facial gesture in which the facial configuration of the user changes during the capturing by the imaging sensor.

5. The method of claim 1, wherein the facial gesture credential record stored by the processor for the authorized user is representative of a facial gesture selected from one or more of opening eyes, closing eyes, raising eyebrows, widening eyes, narrowing eyes, blinking, winking, glaring, rolling eyes, wearing glasses, removing glasses, gazing in given direction, opening mouth, closing mouth, smiling, frowning, sneering, pursing lips, biting lip, baring teeth, flaring nostrils, grimacing, nodding head upward, nodding head downward, shaking head, turning head to right, turning head to left, and combinations of these gestures.

6. The method of claim 1, wherein the step of determining whether the second imaging data matches a facial gesture credential record for the authorized user is based on one or more of local feature matching and entire face template matching.

7. The method of claim 1, further comprising the steps of capturing, by a biometric sensor of the user terminal in communication with the processor, secondary biometric data for the user requesting a cash withdrawal transaction at the user terminal, and comparing the secondary biometric data with one or more secondary biometric credential record stored by the processor; wherein the authorizing step comprises authorizing the cash withdrawal transaction in the event the first imaging data matches the facial recognition credential record for the authorized user, the second imaging data matches the selected facial gesture credential record for the authorized user, and the secondary biometric data matches a secondary biometric credential record stored by the processor for the authorized user.

8. The method of claim 1, wherein the step of detecting the presence of the user requesting the cash withdrawal transaction at the user terminal comprises one or more of detecting insertion of an access card, detecting an input at a touch screen of the user terminal, detecting an input at an input control of the user terminal, detecting communication of a mobile device with the user terminal, and detecting the user entering a field of view of the imaging sensor.

9. The method of claim 1, wherein the selected facial gesture cue includes graphical information having a spatial or pathic relationship to the secret facial gesture.

10. The method of claim 1, wherein the selected facial gesture cue is customized to help the user remember the secret facial gesture without expressly describing the secret facial gesture in a way that would be recognized by third parties.

11. A system, comprising:
 an imaging sensor of a user terminal for capturing first imaging data including a first facial image of a user requesting a cash withdrawal transaction at the user terminal, and for capturing a video containing second imaging data including a second facial image of the user;
 an output device of the user terminal;
 an authentication database hosted by one or more servers comprising non-transitory machine-readable memory, the authentication database configured to store a plurality of facial gesture cues, a plurality of facial recognition credential records, and a plurality of facial gesture credential records;
 one or more server computers comprising one or more processing units executing an authentication module, the one or more server computers in communication with the non-transitory memory and the authentication module configured to execute a set of instructions instructing the one or more servers to:
  receive from the imaging sensor the first imaging data including the first facial image of the user after detecting presence of the user requesting the cash withdrawal transaction at the user terminal;
  determine whether the first imaging data matches a facial recognition credential record for an authorized user included in the plurality of facial recognition credential records stored by the authentication database;
  select a facial gesture cue from two or more facial gesture cues stored by the authentication database for the authorized user for display by the output device in the event the first imaging data matches the facial recognition credential record for the authorized user, wherein the facial gesture cue comprises one or both of verbal information and graphical information that depends on private knowledge of the authorized user to prompt the authorized user to execute a secret facial gesture within a predetermined time duration;
  receive, from the imaging sensor, the video of the user containing the second imaging data including the second facial image of the user upon the display of the facial gesture cue;
  select a facial gesture credential record included in a plurality of facial gesture credential records stored by the authentication database for the authorized user, wherein the selected facial gesture credential record is associated with the selected facial gesture cue and is representative of the secret facial gesture;
  determine whether the second imaging data matches the selected facial gesture credential record; and
  in the event the first imaging data matches the facial recognition credential record for the authorized user, and the second imaging data matches the selected facial gesture credential record for the authorized user, authorize the cash withdrawal transaction for processing, and activate a dispensing of cash based on the authorized cash withdrawal transaction at the user terminal.

12. The system of claim 11, wherein the user terminal is configured to operate in accordance with an ATM protocol, and the one or more server computers comprise an authentication server of a financial institution.

13. The system of claim 11, wherein the imaging sensor is a video camera facing the user at the user terminal, the second imaging data is multi-frame video data, and the facial gesture credential record associated with the authorized user is representative of a dynamic facial gesture in which the facial configuration of the user changes in the video captured by the imaging sensor.

14. The system of claim 11, wherein the facial gesture credential record for the authorized user is representative of a facial gesture selected from one or more of opening eyes, closing eyes, raising eyebrows, widening eyes, narrowing eyes, blinking, winking, glaring, rolling eyes, wearing glasses, removing glasses, gazing in given direction, opening mouth, closing mouth, smiling, frowning, sneering, pursing lips, biting lip, baring teeth, flaring nostrils, grimacing, nodding head upward, nodding head downward, shaking head, turning head to right, turning head to left, and combinations of these gestures.

15. The system of claim 11, further comprising a biometric sensor of the user terminal in operative communication with the processor, wherein the biometric sensor captures and communicates to the processor secondary biometric data for the user, and wherein the processor is further configured to determine whether the secondary biometric data matches a secondary biometric credential record for the authorized user stored by the authentication server, and wherein the processor is configured to authorize the cash withdrawal transaction in the event the first imaging data matches the facial recognition credential record for the authorized user, the second imaging data matches the selected facial gesture credential record for the authorized user, and the secondary biometric data matches the secondary biometric credential record for the authorized user.

16. The system of claim 11, wherein the selected facial gesture cue includes graphical information having a spatial or pathic relationship to the secret facial gesture.

17. The system of claim 11, wherein the selected facial gesture cue to customized to help the user remember the secret facial gesture without expressly describing the secret facial gesture in a way that would be recognized by third parties.

* * * * *